Oct. 2, 1923.
W. S. HARLEY
RIVET REMOVER
Filed July 9, 1920    2 Sheets-Sheet 1
1,469,594
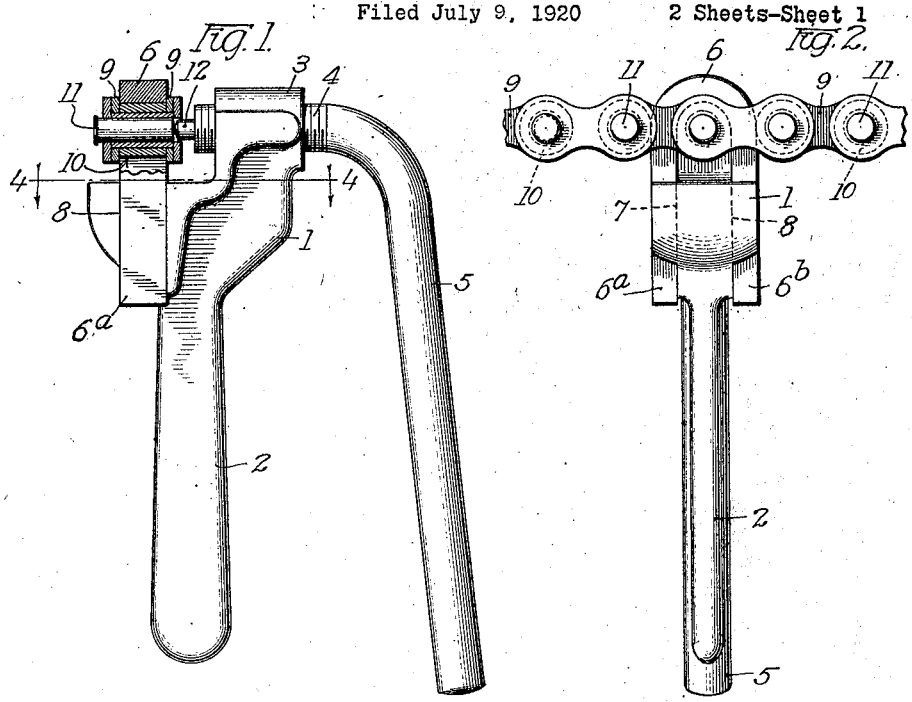
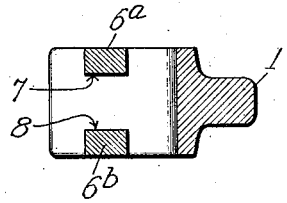
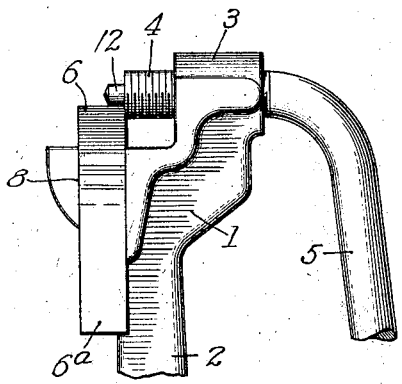
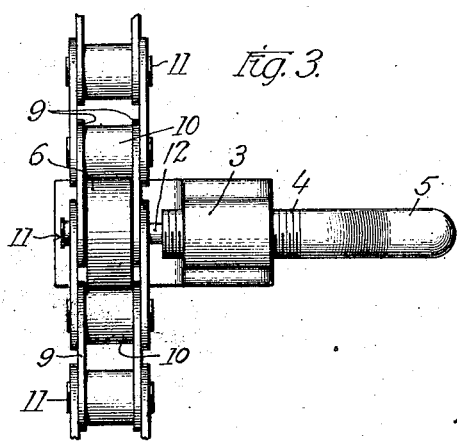
Inventor
William S. Harley Oct. 2, 1923.
W. S. HARLEY
1,469,594
RIVET REMOVER
Filed July 9, 1920    2 Sheets-Sheet 2
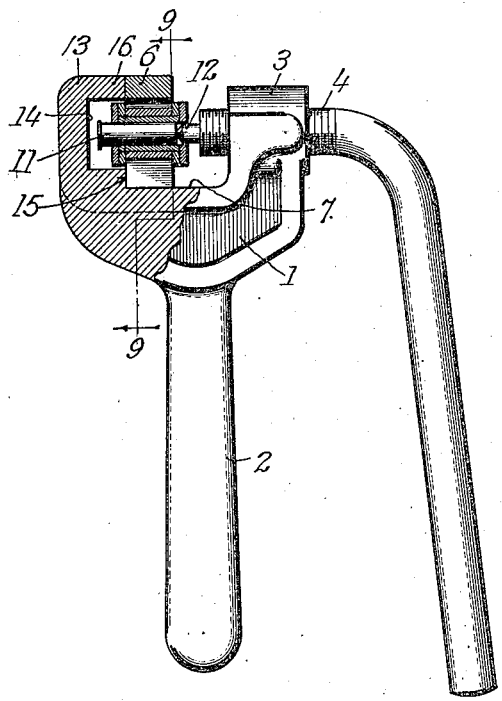
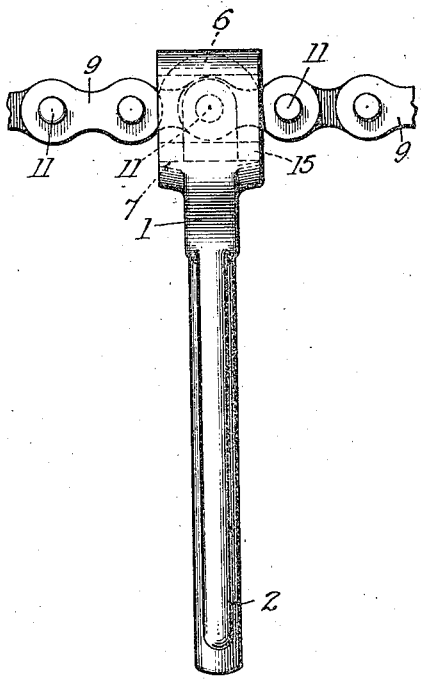
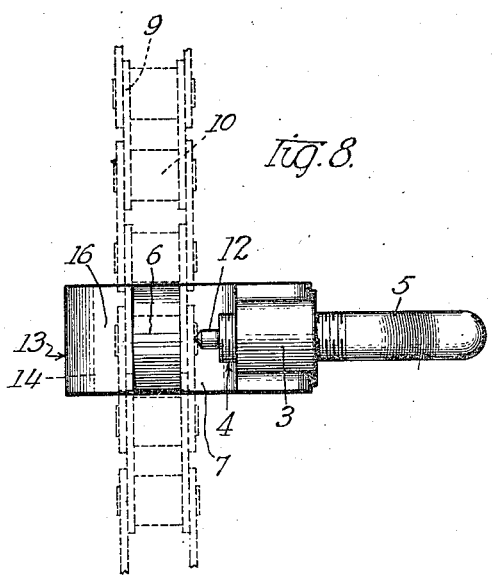
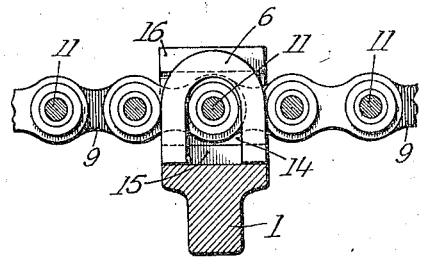
Inventor
William S. Harley
Edwin B. H. Towes
Atty.

Patented Oct. 2, 1923.

1,469,594

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

RIVET REMOVER.

Application filed July 9, 1920. Serial No. 394,882.

*To all whom it may concern:*

Be it known that I, WILLIAM S. HARLEY, a citizen of the United States, residing at Milwaukee, in the county of Milwaukee and State of Wisconsin, have invented new and useful Improvements in Rivet Removers, of which the following is a specification.

This invention relates to a rivet remover.

It is particularly applicable to the removal of rivets from the links of chains, although not limited to such use.

Chains employed on motorcycles and bicycles, etc., as usually constructed have alternate links made in complete standard units. These units comprise side straps spaced apart and connected at each end by hollow rivets or sleeves which support rollers. These rollers engage the teeth of the sprocket wheels connected by the chain. These unitary links are joined by intermediate links formed of two side straps connected at their ends by rivets passing through the hollow rivets or sleeves of the unitary links.

When making repairs on such chains, the rivets of the intermediate links must be punched or removed from at least one of the straps joined thereby.

One of the objects of this invention is to provide an improved rivet remover for expeditiously removing rivets from the links of chains, etc.

Another object is to provide a chain repair tool in which the link from which the rivet is to be removed may be readily positioned in rivet removing position.

Another object is to provide an improved chain repair tool having a removable anvil for facilitating the placing of the link in rivet removing position.

Another object is to provide an improved rivet remover wherein the chain may be definitely positioned in a removable supporting anvil thereof and may be quickly brought into rivet removing position.

Another object is to provide a simple, efficient and durable rivet remover which is inexpensive to manufacture.

Other objects and advantages will appear from the description and claims.

According to the invention, the rivet remover comprises a head having a removable chain supporting anvil and having an aperture through which a rivet removing punch extends and is axially movable.

The accompanying drawings illustrate embodiments of the invention.

In the drawings:

Fig. 1 is a side elevation, partly in section, of the rivet remover having a cantalever chain supporting anvil;

Fig. 2 is a bottom plan thereof;

Fig. 3 is a front elevation thereof;

Fig. 4 is a transverse section on line 4—4 of Fig. 1.

Fig. 5 is a side elevation of the rivet remover with the anvil in locked position;

Fig. 6 is a side elevation, partly in section, of the rivet remover having a bracket supporting the anvil;

Fig. 7 is a front elevation of the rivet remover of Fig. 6;

Fig. 8 is an end elevation thereof; and

Fig. 9 is a transverse section on line 9—9 of Fig. 6

Figures 1 to 5 show a rivet remover having a chain supporting anvil removably supported in guide slots in the head thereof.

The rivet remover comprises a head 1 attached to a handle 2. The head 1 has a projection 3, having a threaded opening through which extends a rivet removing punch 4. A handle 5 for actuating the punch is attached thereto.

The rivet remover has a chain supporting anvil 6 which may be U shaped. The legs $6^a$ and $6^b$ of this U shaped anvil extend into guide slots 7 and 8 provided upon opposite sides of the head 1. These guide slots are so located that when the anvil is positioned therein, the center line thereof is in substantial alignment with the axis of the punch 4. The anvil is removable from the guide slots and is adjustable therein. Consequently, the rivet to be removed may be readily and quickly brought into operative position with respect to the punch.

A chain needing repairs may have one of its links quickly positioned in the rivet remover. This may be done by first removing the anvil 6 from the rivet remover and then passing the legs $6^a$ and $6^b$ thereof between the straps 9 and upon opposite sides of one of the rollers 10 at opposite ends of the complete chain link unit. The anvil supporting the chain then may be restored to the rivet remover, and the rivet 11 to be removed quickly brought into position immediately opposite the end 12 of the punch 4.

Then by turning the handle 5 and holding the handle 2 the punch may be fed through the threaded aperture in the head of the rivet remover and thereby force the rivet 11 from the chain.

When the rivet remover is not in use, its anvil 6 may be thrust against the head and locked in such position by the punch 4, as shown in Figure 5.

Figures 6 to 9 show a rivet remover which differs from that already described merely in that the anvil 6 is shorter and is supported by a bracket or projection of the head.

The head 1 is provided with a second projection 13 positioned opposite projection 3. This projection is adapted to support the removable anvil 6 and is provided with a groove or slot 14 in its upper base for receiving the straps of the chain links and the rivet 11 as it is removed from the chain. The anvil 6 when positioned in the rivet remover has its open end supported by the shoulder 15 of the projection 13 and its closed end supported by the outer face 16 of the projection.

This rivet remover is simple, efficient and durable.

The anvil of the rivet remover is removable and adjustable and the chain may be easily and quickly brought into operative position with respect to the punch of the rivet remover.

The invention contained herein is, of course, susceptible of other embodiments and adaptations.

What is claimed is:

1. A chain repair tool having a vertically disposed head, a projection extending forwardly from the upper end thereof, a handle integrally united to the head intermediate the upper and lower extremities thereof, and extending horizontally and rearwardly therefrom, a punch axially movable through a vertical opening in the projection, means for operating the punch, a U-shaped anvil for insertion between the links of a chain, and means integral with the lower end of the head for supporting the anvil in adjusted position beneath the punch.

2. A rivet remover comprising a head having parallel slots in opposite sides thereof, a projection extending forwardly from the upper end of the head, a punch axially movable through a vertical opening in the projection, and a U-shaped anvil having parallel legs for extending into the slots so as to support the free end of the anvil in adjusted position beneath the punch.

3. A rivet remover having in combination a head having transversely extending slots therein, a punch carried by the head, a forked anvil supported at one end only in the slots, and means for operating the punch so as to advance the same toward the forked anvil adjustably positioned there below.

4. A rivet remover having in combination a vertically disposed head provided with a pair of transversely extending slots located on opposite sides thereof, a projection extending forwardly from the upper end of the head, a punch axially movable through a vertical opening in the projection, means for operating the punch, and a U-shaped anvil for insertion between the links of a chain and having the legs thereof extending into the slots so that the anvil is supported at one end only in adjusted position beneath the punch.

In witness whereof, I have hereunto subscribed my name.

WILLIAM S. HARLEY.